US007009804B2

(12) United States Patent
Sharma et al.

(10) Patent No.: US 7,009,804 B2
(45) Date of Patent: Mar. 7, 2006

(54) METHOD AND APPARATUS FOR MICRO-ACTUATOR STROKE SENSITIVITY CALIBRATION IN A HARD DISK DRIVE

(75) Inventors: Vinod Sharma, Los Gatos, CA (US); Hyung Jai Lee, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 4 days.

(21) Appl. No.: 10/903,731

(22) Filed: Jul. 29, 2004

(65) Prior Publication Data

US 2006/0023341 A1 Feb. 2, 2006

(51) Int. Cl.
*G11B 5/596* (2006.01)

(52) U.S. Cl. .............................. 360/77.02; 360/78.05; 73/865.9

(58) Field of Classification Search ..................... None
See application file for complete search history.

(56) References Cited

U.S. PATENT DOCUMENTS 6,510,752 B1 * 1/2003 Sacks et al. ............... 73/865.9
6,724,563 B1 * 4/2004 Kobayashi et al. ...... 360/78.05
6,898,039 B1 * 5/2005 Kobayashi et al. ........... 360/60

OTHER PUBLICATIONS

Bullock, Thomas B., Master/Slave Coordination, http://www.control.com/control_com/Papers/masslave_html, Sep. 6, 2003, 5, pages.
Bullock, Thomas B., Motion Control and Industrial Controllers, http://www.control.com/control_com/Papers/mc-ic_html, Sep. 6, 2003, 11 pages.
F.E., Rosa, A.R.S., Carrara and A.H. Souza, A Master-Slave DSP Board for Digital Control, Master Slave prior art, Sep. 6, 2003, 5 pages.
Gawronski, W. et al., Should the Master Equatorial Be a Slave?, Master Slave prior art, Sep. 6, 2003, 22 pages.
Yoshikawa, Tsuneo and Ueda, Analysis and Control of Master-slave Systems with Time Delay, Unknown, 9 pages, Department of Mechanical Engineering, Kyoto University, Kototo 606, Japan.
Pratical Motion Control for Engineers & Technicians, Unknown, 2 pages.

* cited by examiner

*Primary Examiner*—Andrew L. Sniezek
(74) *Attorney, Agent, or Firm*—GSS Law Group; Jeffrey P. Aiello; Earle Jennings

(57) ABSTRACT

A sinusoidal signal is added to the notch filtered micro-actuator control signal stimulating the micro-actuator. The voice coil control signal is notch filtered to remove the frequency component of the sinusoidal signal before it stimulates the voice coil motor. The micro-actuator control signal is notch filtered to remove the frequency component of the sinusoidal signal before it stimulates the micro-actuator. The response of the system is measured as the Position Error Signal (PES), for the magnetic head moved by the micro-actuator. The measured PES is then demodulated at the frequency of the sinusoidal signal to create a measured amplitude. The stroke sensitivity is then calculated from the measured amplitude and amplitude of the sinusoidal stimulus. The frequency of the sinusoidal signal and notch filters is essentially the same, chosen away from significant excitation frequencies and outside the bandwidth of the servo system. The invention includes using multiple frequencies, as well as various formulas for the stroke sensitivity. The invention may be applied to more than one micro-actuator within the hard disk drive to create a stroke sensitivity for each micro-actuator, a combination, or for all micro-actuators. The invention includes the method implemented using a servo-controller, as well as the program system for the servo-controller, at least partly implementing the method.

23 Claims, 8 Drawing Sheets

METHOD AND APPARATUS FOR MICRO-ACTUATOR STROKE SENSITIVITY CALIBRATION IN A HARD DISK DRIVE

BACKGROUND OF THE INVENTION

1. Field of the Invention

The present invention relates to calibrating a micro-actuator that positions a magnetic head in a hard disk drive.

2. Background Information

Hard disk drives contain one or more magnetic heads coupled to rotating disks. The heads write and read information by magnetizing and sensing the magnetic fields of the disk surfaces. Typically, magnetic heads have a write element for magnetizing the disks and a separate read element for sensing the magnetic field of the disks. The read element is typically constructed from a magneto-resistive material. The magneto-resistive material has a resistance that varies with the magnetic fields of the disk. Heads with magneto-resistive read elements are commonly referred to as magneto-resistive (MR) heads.

Each head is embedded in a slider. The slider mechanically couples to an actuator arm by a head suspension assembly. The head suspension assembly includes a load beam connected to the actuator arm by a spring or hinge coupling. The slider is attached to a flexure arm and the flexure is attached to the load beam to form a head gimbal assembly (HGA). The head gimbal assembly includes the head suspension assembly, the flexure and the slider. Each HGA in a hard disk drive couples to an actuator arm by the hinge coupling. The actuator arms rigidly couple to a voice coil motor that moves the heads across the surfaces of the disks.

Information is typically stored in radial tracks that extend across the surfaces of each disk. Each track is typically divided into a number of segments or sectors. The voice coil motor and actuator arm can move the heads to different tracks of the disks and to different sectors of each track.

A suspension interconnect extends along the length of the flexure and connects the head to a preamplifier. The suspension interconnect typically includes a pair of conductive write traces and a pair of conductive read traces.

The Tracks Per Inch (TPI) in hard disk drives is rapidly increasing, leading to smaller and smaller track positional tolerances. The track position tolerance, or the offset of the magnetic head from a track, is monitored by a signal known as the head Positional Error Signal (PES).

Track Mis-Registration (TMR) occurs when a magnetic head loses the track registration. This often occurs when the disk surface bends up or down. TMR is often a statistical measure of the positional error between a magnetic head and the center of an accessed track.

Today, the bandwidth of the servo controller feedback loop, or servo bandwidth, is typically in the range of 1.1 KHz.

Extending servo bandwidth, increases the sensitivity of the servo controller to drive the voice coil actuator to ever finer track positioning. Additionally, it decreases the time for the voice coil actuator to change track positions.

However, extending servo bandwidth is difficult, and has not significantly improved in years. As track densities increase, the need to improve track positioning, and servo bandwidth, increases. One answer to this need involves integrating a micro-actuator into each head gimbal assembly. These micro-actuators are devices typically built of piezoelectric composite materials, often including lead, zirconium, and tungsten. The piezoelectric effect generates a mechanical action through the application of electric power. The piezoelectric effect of the micro-actuator, acting through a lever between the slider and the actuator arm, moves the magnetic head over the tracks of a rotating disk surface.

The micro-actuator is typically controlled by the servo-controller through one or two wires. Electrically stimulating the micro-actuator through the wires triggers mechanical motion due to the piezoelectric effect. The micro-actuator adds fine positioning capabilities to the voice coil actuator, which effectively extends the servo bandwidth. The single wire approach to controlling one micro-actuator provides a DC (direct current) voltage to one of the two leads of the piezoelectric element. The other lead is tied to a shared ground. The two wire approach drives both leads of one micro-actuator.

There are two approaches to integrating the micro-actuator into a head gimbal assembly. Embedding the micro-actuator between the slider and the load beam, creates a co-located micro-actuator. Embedding the micro-actuator into the load beam, creates a non co-located micro-actuator. The non co-located micro-actuators tend to consume more power, requiring higher driving voltages than the co-located micro-actuators.

A problem arises with integrating micro-actuators into hard disk drives. The micro-actuator devices may vary greatly from part to part. When integrated, the assemblies may respond differently than the isolated micro-actuators. The integrated micro-actuators may also vary significantly at different operating temperatures. A method is needed for measuring the micro-actuator stroke sensitivity when integrated into the hard disk drive. The actuator stroke sensitivity is an estimate of how far the micro-actuator moves the magnetic head at a given voltage of stimulus applied to the micro-actuator.

A second problem arises when integrating micro-actuators into hard disk drives with multiple disk surfaces. Each of the micro-actuators requires its leads to be controlled by the servo-controller. These leads are coupled to wires, which must traverse the main flex circuit to get to the bridge flex circuit. The bridge flex circuit provides electrical coupling to the leads of the micro-actuator.

The main flex circuit constrains many components of the actuator arm assembly within a voice coil actuator. If the shape or area of the main flex circuit is enlarged, changes are required to many of the components of the actuator arm assembly and possibly the entire voice coil actuator. Changing many or most of the components of an actuator arm assembly, leads to increases in development expenses, retesting and recalibrating the production processes for reliability, and inherently increases the cost of production.

The existing shape and surface area of the main flex circuit has been extensively optimized for pre-existing requirements. There is no room in the main flex circuit to run separate control wires to each micro-actuator for multiple disk surfaces. This has limited the use of micro-actuators to hard disk drives with only one active disk surface.

BRIEF SUMMARY OF THE INVENTION

The present invention includes a method and apparatus calibrating the stroke sensitivity of a micro-actuator integrated into a hard disk drive.

The invention operates as follows. A sinusoidal signal is added to the notch filtered micro-actuator control signal stimulating the micro-actuator. The voice coil control signal is notch filtered to remove the frequency component of the sinusoidal signal before it stimulates the voice coil motor.

The micro-actuator control signal is notch filtered to remove the frequency component of the sinusoidal signal before it stimulates the micro-actuator. The response of the system is measured as the Position Error Signal (PES), for the magnetic head moved by the micro-actuator and voice coil motor. The measured PES is then demodulated at the frequency of the sinusoidal signal to create a measured amplitude. The stroke sensitivity is then calculated from the measured amplitude. As used herein, a notch filter removes a narrow band from around the frequency of the notch filter input signal to generate its output signal.

The frequency of the sinusoidal signal and the notch filter frequency of the micro-actuator control are essentially the same. This frequency is outside the bandwidth of the servo system, and away from any significant excitation resonance of the system. Using such a frequency insures that the response of the micro-actuator is flat, providing the DC response as the measured amplitude. Demodulation of the response removes any other response components, which might otherwise corrupt and/or complicate the calibration.

Preferably, the servo-controller digitally provides the elements of the invention. The method of the invention may preferably be implemented to include the program system of the servo-controller residing as program steps in a memory accessibly coupled with the servo-controller.

The micro-actuator stimulus may preferably be concurrently provided to more than one micro-actuator. The micro-actuators may further preferably be concurrently stimulated in parallel.

Additionally, the calibration may be performed at more than one ambient temperature within the hard disk drive.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventors for carrying out the invention. Various modifications, however, will remain readily apparent to those skilled in the art, since the generic principles of the present invention have been defined herein.

The present invention includes a method and apparatus calibrating the stroke sensitivity 1700 of at least one micro-actuator 310 integrated into a hard disk drive 10 as shown in FIGS. 1 to 3, 4A, and 5.

Figure 1:
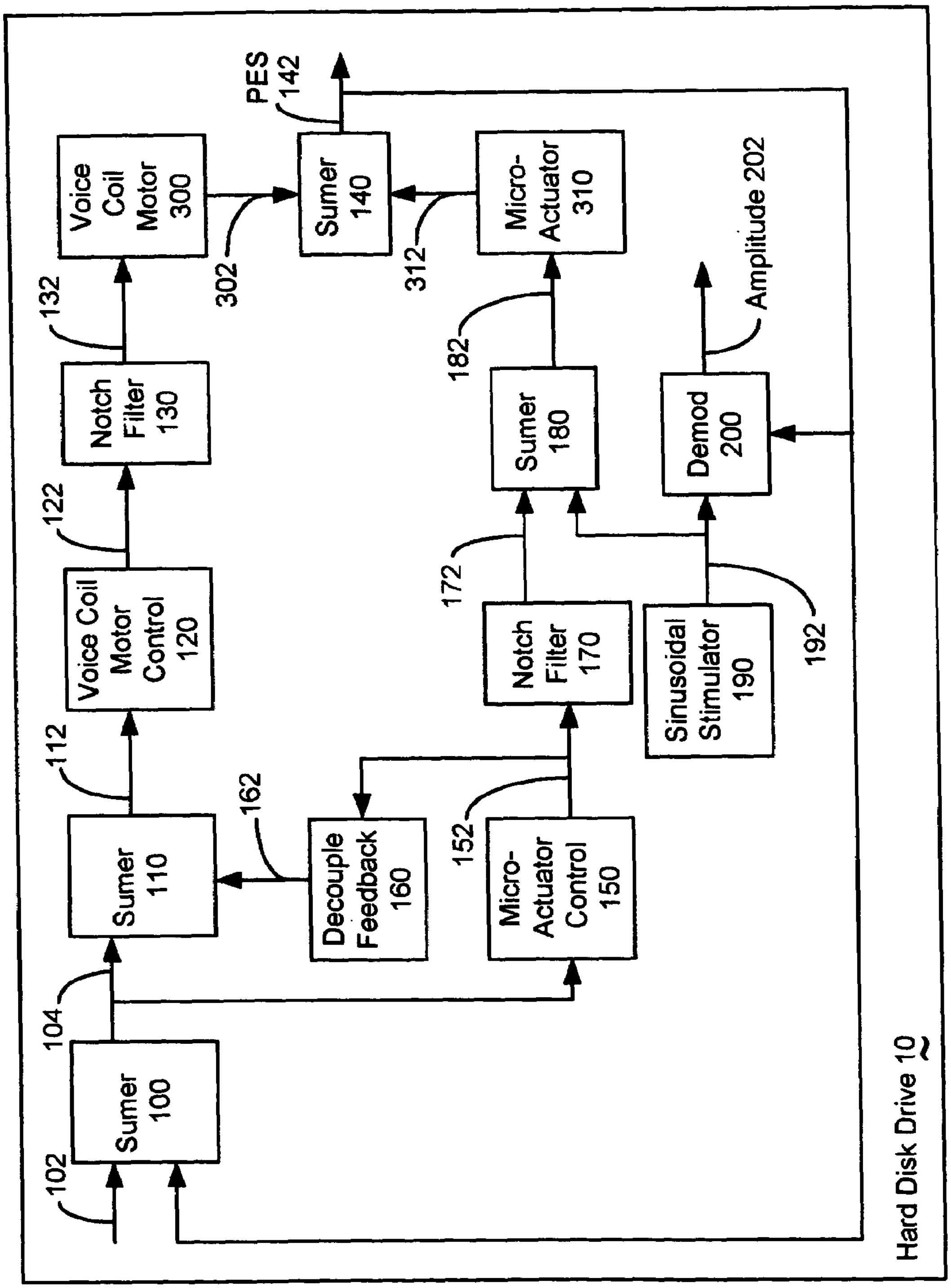
FIG. 1 shows the control signal flow within a hard disk drive creating the amplitude of the response to a sinusoidal signal.
Figure 2:
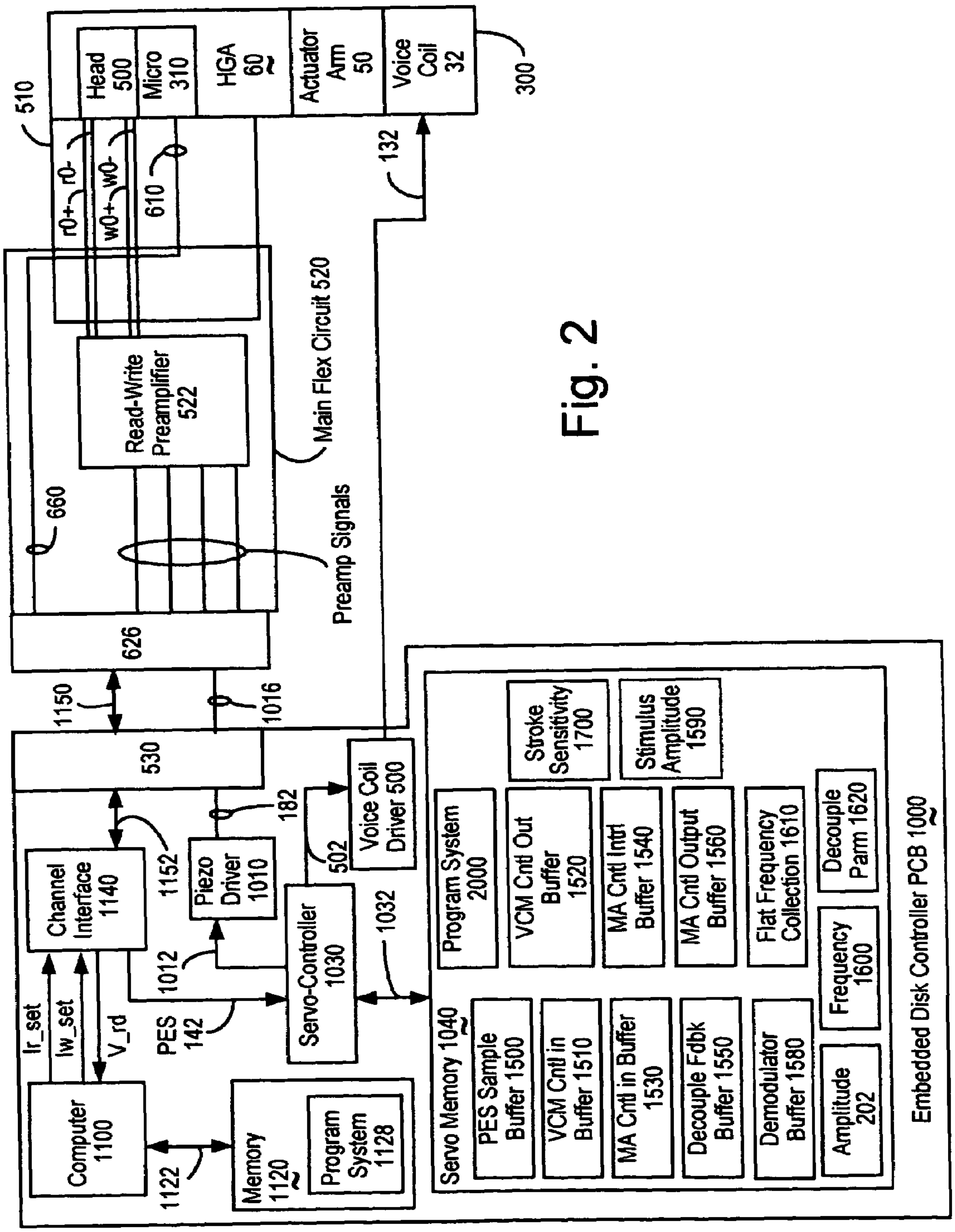
FIG. 2 shows a block diagram implementing the control signal flow of FIG. 1.

FIG. 1 shows the control signal flow within a hard disk drive 10 creating the amplitude 202 from the PES response 142 demodulated 200 by a sinusoidal signal 192 of frequency 1600 (shown in FIG. 2). The control signal flow is composed of two control paths, which share a feedback of the PES 142. The two control signal paths are decoupled by a decoupling feedback filter 160.

FIG. 1 shows a voice coil motor control path including the following. The voice coil motor control 120 creates a voice coil control signal 122. The voice coil control signal 122 is isolated by a notch filter 130 from the frequency 1600 (of FIG. 2) to create the notch filtered voice coil control signal 132. The notch filtered voice coil control signal 132 simulates the voice coil motor 300. FIG. 2 further shows the voice coil control signal 132 stimulating the voice coil 32, which is shown within the voice coil motor 300 in FIG. 5.

FIG. 1 shows a micro-actuator control path including the following. A micro-actuator control 150 generates a micro-actuator control signal 152. The micro-actuator control signal 152 is isolated by notch filter 172 from frequency 1600 (of FIG. 2) to create the notch filtered micro-actuator control signal 172. A sinusoidal stimulator 190 provides a sinusoidal stimulus 192 at the frequency 1600. The notch filtered micro-actuator control signal 172 and sinusoidal stimulus 192 are added 180 together to create the micro-actuator stimulus 182 provided to at least one of the micro-actuators 310.

Figure 4A:
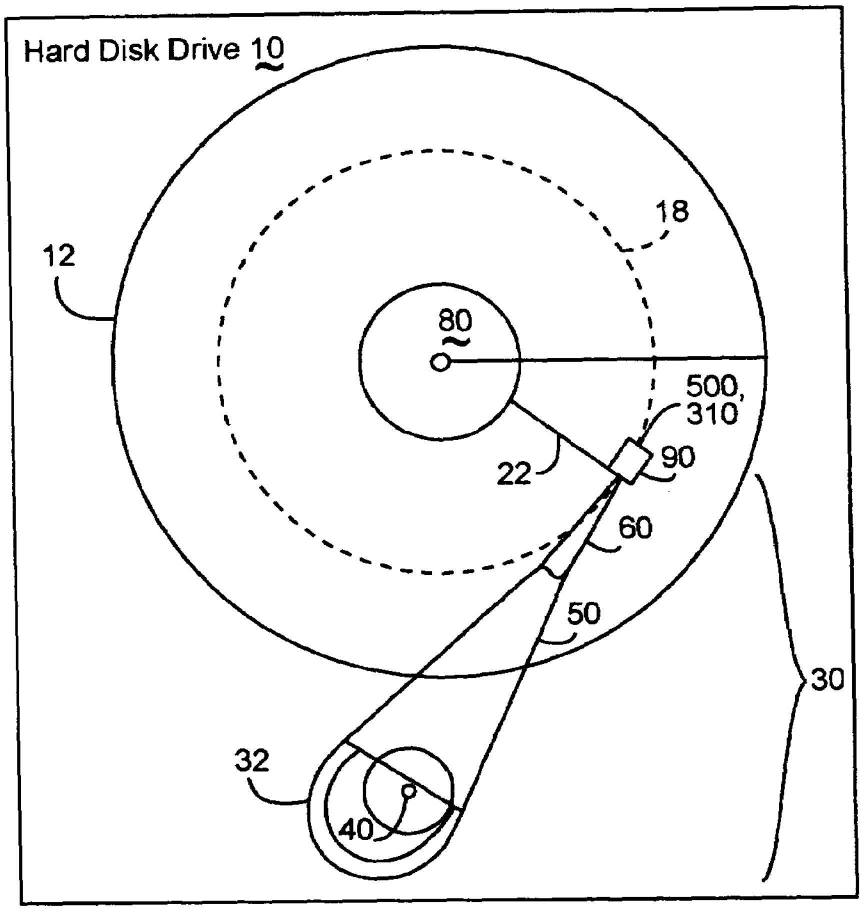
FIG. 4A shows the relationship between of the voice coil motor and actuator assembly traversing a rotating disk surface while following a track.

FIG. 1 shows the Position Error Signal (PES) 142 as the additive response 140 of the effect 302 of the voice coil motor 300 and the effect 312 of the micro-actuator 310. The effect 302 of the voice coil motor 300 positions the magnetic head 500 over a track 18 of a rotating disk surface 12, as shown in FIG. 4A.

FIG. 1 shows the voice coil motor control path decoupled from the micro-actuator control path by the following. The micro-actuator control signal 152 is presented to the decoupling feedback filter 160 to create a decoupling micro-actuator feedback signal 162. The PES 142 feedback is removed 100 from the servo system direction 102 to create a first corrected signal 104, which is presented to the micro-actuator control 150. The first corrected signal 104 is also presented to the sumer 110, where the decoupling micro-actuator feedback signal 162 is removed to create the voice coil motor control stimulus 112. The effect of sumers 100 and 110 is that the feedback of PES 142 and the decoupling micro-actuator feedback signal 162 are removed from the direction 102 of the servo system to create the stimulus 112.

FIGS. 1 and 2 show the micro-actuator stimulus 182 provided to one micro-actuator 310.

Figure 3:
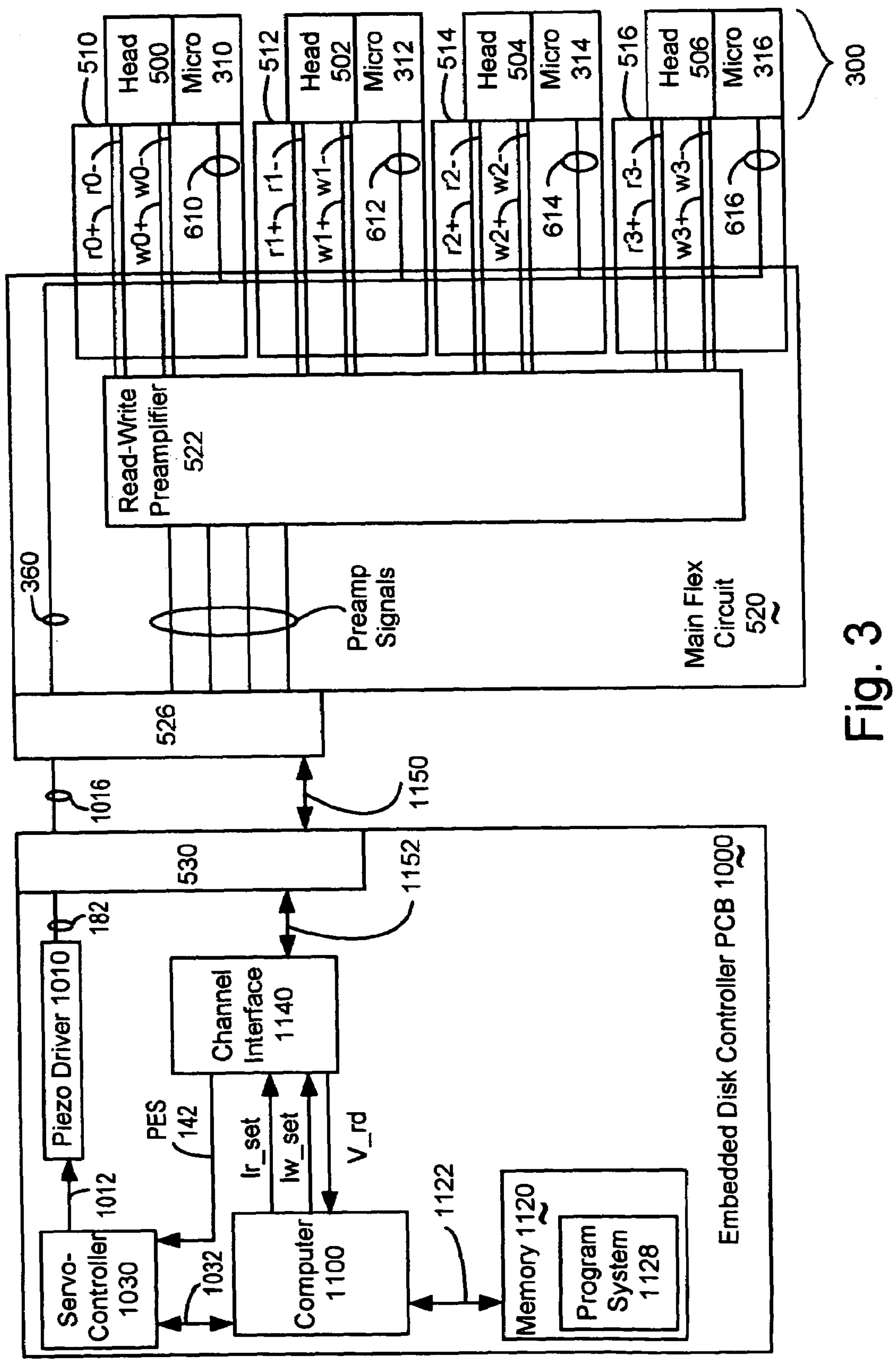
FIG. 3 shows a preferred refinement of FIG. 2 showing the sharing of a micro-actuator stimulus signal among multiple micro-actuators.

FIG. 3 shows the micro-actuator stimulus 182 provided to multiple micro-actuators, 310–316. FIG. 3 shows a further preferred embodiment, providing the micro-actuator stimulus 182 in parallel to each of the micro-actuators 310–316. FIGS. 2 and 3 show a single wire approach to stimulating the micro-actuator(s). In certain, sometimes preferred, circumstances, the micro-actuators may include a second lead presented a common signal, often ground. In certain other circumstances, the micro-actuators may be stimulated by a two wire signal.

In many circumstances, the micro-actuators may, preferably include at least one piezo-electric device. However, one skilled in the art will recognize that at least one of the micro-actuators may include an electrostatic device and/or an electromagnetic device. While these alternatives are potentially viable and of use, the remainder of this discussion will focus on piezo-electric based micro-actuators. This is to simplify the discussion, and is not meant to limit the scope of the claims for this invention.

FIG. 2 shows a block diagram implementing the control signal flow of FIG. 1. The embedded disk controller Printed Circuit Board (PCB) 100 uses a program system 2000, a collection of buffers 1500–1580, and parameters 1590–1620, interacting through the servo-controller 1030. These components act together with a voice coil driver 500 and at least one piezo driver 1010 to calibrate the stroke sensitivity 1700 of at least one micro-actuator 310 positioning a magnetic head 500.

The buffers 1500–1580 of FIG. 2 may be used by the relevant operations of the invention to store one or more items. Examples may include input buffers such as the PES sample buffer 1500, the voice coil motor control input buffer 1510, and the micro-actuator control input buffer 1530. Example output buffers may include the voice coil motor control output buffer 1520 and the micro-actuator control output buffer 1560. There may be buffers which acts either to store intermediate values, or as both input and output buffers, such as the micro-actuator intermediate buffer 1540, the decoupling feedback buffer 1550, and the demodulator buffer 1580.

Figure 5:
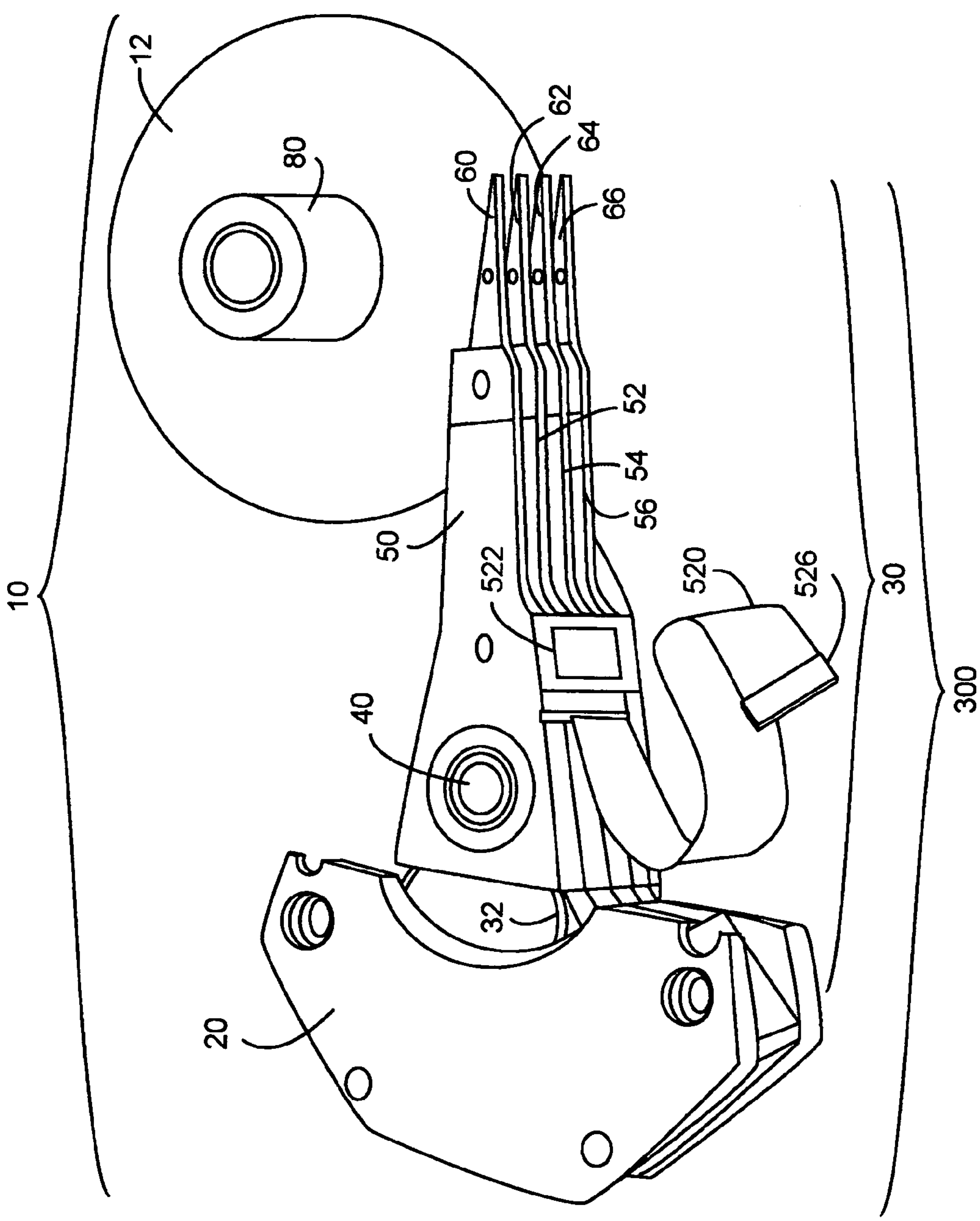
FIG. 5 shows a simplified diagram of the voice coil motor and actuator assembly of a hard disk drive as in FIGS. 1 to 4A.

FIG. 4A shows the voice coil motor 300 and the actuator assembly 30 following a track 18 of a rotating disk surface 12 in a hard disk drive 10. FIG. 5 shows further details of the voice coil motor 300 and an alternative actuator assembly 30. The actuator assembly 30 of FIG. 4A shows one actuator arm 50, whereas the alternative actuator assembly 30 of FIG. 5 shows multiple actuator arms 50–56.

The voice coil motor 300 of FIGS. 4A and 5 includes the actuator assembly 30, coupled with voice coil 32. The actuator assembly 30 includes at least one actuator arm 50. Each actuator arm 50 couples with at least one Head Gimbal Assembly (HGA) 60. Each HGA 60 couples with at least one slider 90. Embedded in each slider 90 is a magnetic head 500, which is positioned to follow a track 18 at a very small distance above the rotating disk surface 12. An actuator assembly includes the voice coil 32, the actuator arms 50–56, the HGAs 60–66, each with at least one slider (not shown in FIG. 5).

The voice coil motor 300 in FIG. 5 includes the actuator assembly 30 and the fixed magnet 20. Stimulating 132 the voice coil motor 300 in FIG. 1 involves stimulating 132 the voice coil 32 in FIG. 2. The effect 302 of the voice coil motor 300 includes the interaction of the fixed magnet 20 with the voice coil 32. This coupling of the voice coil with the actuator arm 50, and its coupling with the HGA 60, moves the slider 90, with its embedded magnetic head 500, by a lever action, as in FIG. 4A. The lever action pivots through actuator axis 40.

There are two mechanisms acting to position magnetic head 500 close to track 18 in FIGS. 4A and 5. The voice coil motor 300 includes the voice coil 32 interacting with fixed magnet 20. The interaction of voice coil 32 pivots actuator assembly 30 through actuator axis 40.

Additionally, the micro-actuator 500 interacts with the HGA 60 and the slider 90 to position magnetic head 500.

Figure 6:
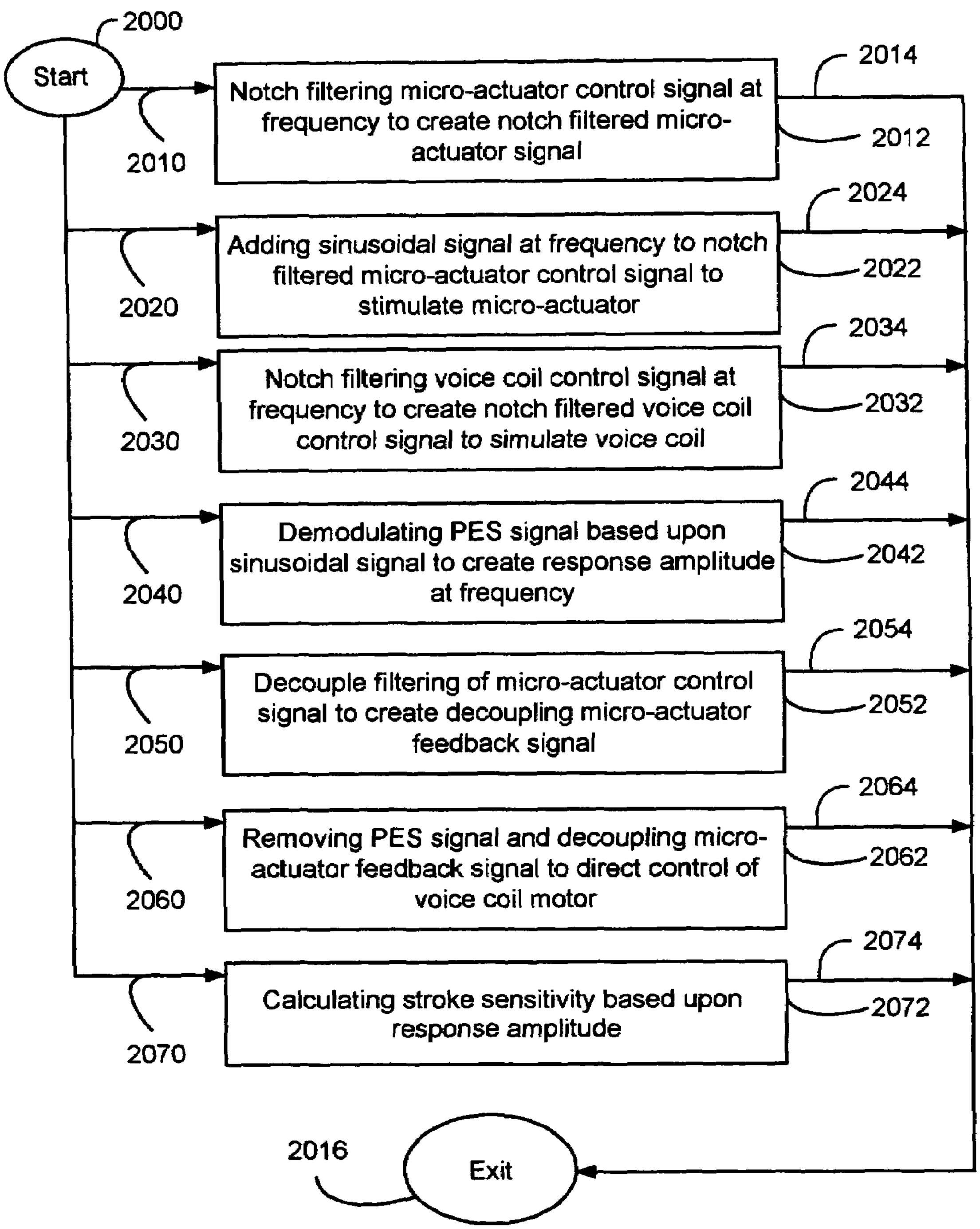
FIG. 6 shows a flowchart of the invention's method of FIGS. 1 and 2 calibrating at least one of the micro-actuators of FIGS. 1–4A and 5.

The method of calibrating the stroke sensitivity 1700 of the micro-actuator 310 of FIG. 2 is shown as a flowchart in FIG. 6 of at least one program step of the program system 2000.

These program steps reside in a servo memory 1040, which is accessibly coupled 1032 with the servo controller 1030.

Preferably, the servo-controller 1030 of FIGS. 2 and 3, digitally provides the elements of the invention. Preferably, the method implementation includes the program system 2000 of the servo-controller 1030 residing as the program steps of FIGS. 6 to 7C in a servo memory 1040 accessibly coupled 1032 with the servo-controller 1030. The servo memory 1040 may include any combination of volatile and non-volatile memory. As used herein, volatile memory requires a power supply to maintain its memory states, whereas a non-volatile memory has at least one memory state which persists without a power supply.

Some of the following figures show flowcharts of at least one method of the invention, possessing arrows with reference numbers. These arrows will signify of flow of control and sometimes data supporting implementations including at least one program operation or program thread executing upon a computer, inferential links in an inferential engine, state transitions in a finite state machine, and dominant learned responses within a neural network.

The operation of starting a flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network.

A computer as used herein will include, but is not limited to an instruction processor. The instruction processor includes at least one instruction processing element and at least one data processing element, each data processing element controlled by at least one instruction processing element. By way of example, a computer may include a general purpose computer and a Digital Signal Processor (DSP). The DSP may directly implement fixed point and/or floating point arithmetic.

FIG. 6 shows a flowchart of program system 2000 of FIG. 2 calibrating at least one micro-actuator of FIGS. 1–4A and 5, which implements the method of the invention.

The frequency 1600 of the sinusoidal signal 192 and the frequency of the notch filter 170 of the micro-actuator control signal 152 are essentially the same. This frequency 1600 is outside the bandwidth of the servo system, and away from any significant excitation resonance of the system. Using such a frequency insures that the response of the micro-actuator 310 is flat, providing the measured amplitude as a constant response. Demodulation of the response may remove any other response components, which might otherwise corrupt and/or complicate the calibration.

Figure 4B:
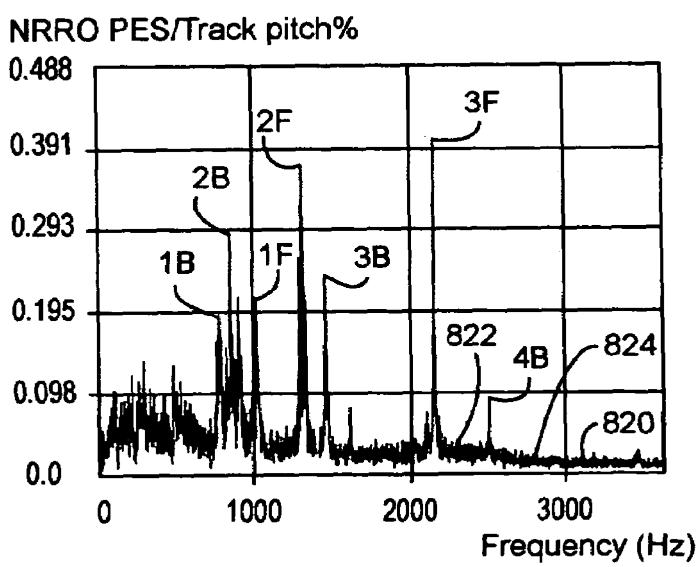
FIG. 4B shows a typical spectrum for a contemporary hard disk drive with several significant excitation resonances.

FIG. 4B shows a typical non-repeatable run-out (NRRO) spectrum for a contemporary hard disk drive with several significant excitation resonances. These significant resonances are labeled 1B, 1F, 2B, 2F, 3B, 3F, 4B, and 4F. These resonances are significant because of their affect on the PES signal, which is shown in terms of a percentage fraction of the track pitch, also known herein as track width. In a typical contemporary disk drive lacking a micro-actuator, the bandwidth of the servo system is often in the range of 1 KHz to 1.1 KHz.

In a hard disk drive employing micro-actuators, the bandwidth of the servo system has been reported in excess of 1.8 KHz. Two potential frequencies, a first frequency 822 and a second frequency 824 of FIG. 4B, are outside the bandwidth of the servo system and away from the significant excitation resonances of the system. These frequencies may be members of a flat frequency collection 1610, as in FIG. 2. Either frequency may be preferred for frequency 1600.

In FIGS. 1, 2, and 6, operation 2012 notch filters 170 a micro-actuator control signal 152 at a frequency 1600 to create a notch filtered micro-actuator signal 172. Preferably, a digital filter implements the notch filter 170. Further, the notch filter 170 may be implemented as a block transform, such as a Fast Fourier Transform.

In FIGS. 1, 2, and 6, operation 2022 adds 180 a sinusoidal signal 192 at the frequency 1600 to the notch filtered micro-actuator control signal 172 to stimulate 182 the micro-actuator 310. The sinusoidal signal 192 has the frequency 1600. The sinusoidal signal 192 further preferably has a stimulus amplitude 1590. In certain further preferred embodiments, the stimulus amplitude 1590 may be varied. Varying the stimulus amplitude 1590 can aid in statistically refining the stroke sensitivity 1700.

In FIGS. 1, 2, and 6, operation 2032 notch filters 130 a voice coil control signal 122 at the frequency 1600 to create a notch filtered voice coil control signal 132 to simulate the voice coil motor 300. The notch filtered voice coil control signal 132 may further, preferably, simulate the voice coil 32 within the voice coil motor 300.

In FIGS. 1, 2, and 6, operation 2042 demodulates 200 the PES signal 142 based upon the sinusoidal signal 192 to create a response amplitude 202 at the frequency 1600.

In FIGS. 1, 2, and 6, operation 2052 performs the decoupled filtering 160 of the micro-actuator control signal 152 to create a decoupling micro-actuator feedback signal 162. The decoupling filter parameters (parm) 1620 may direct the operation 2052 of decoupling filter 160. The decoupling filter parameters 1620 may include, but are not limited to, band pass parameters, phase control parameters, and various weights to be applied to one or more bands. The weights are applied to different band components, usually by multiplying the weights by the band components, and then adding the results to at least partly form the decoupling filter output 162.

In FIGS. 1, 2, and 6, operation 2062 removes 100 the PES signal 142 and removes 110 the decoupling micro-actuator feedback signal 162 to direct 112 control 120 of the voice coil motor 300. Note that the order of removing 100 and 110 may be reversed in certain embodiments of the invention. Alternatively, the removals may be essentially concurrently performed, without any inherent sequential order.

In FIGS. 1, 2, and 6, operation 2072 calculates the stroke sensitivity 1700 based upon at least the response amplitude 202. This operation will be further discussed in FIG. 7C.

The invention includes the ability to calibrate the stroke sensitivity 1700 at more than one frequency 822 and 824, as shown in FIG. 4B.

Figure 7A:
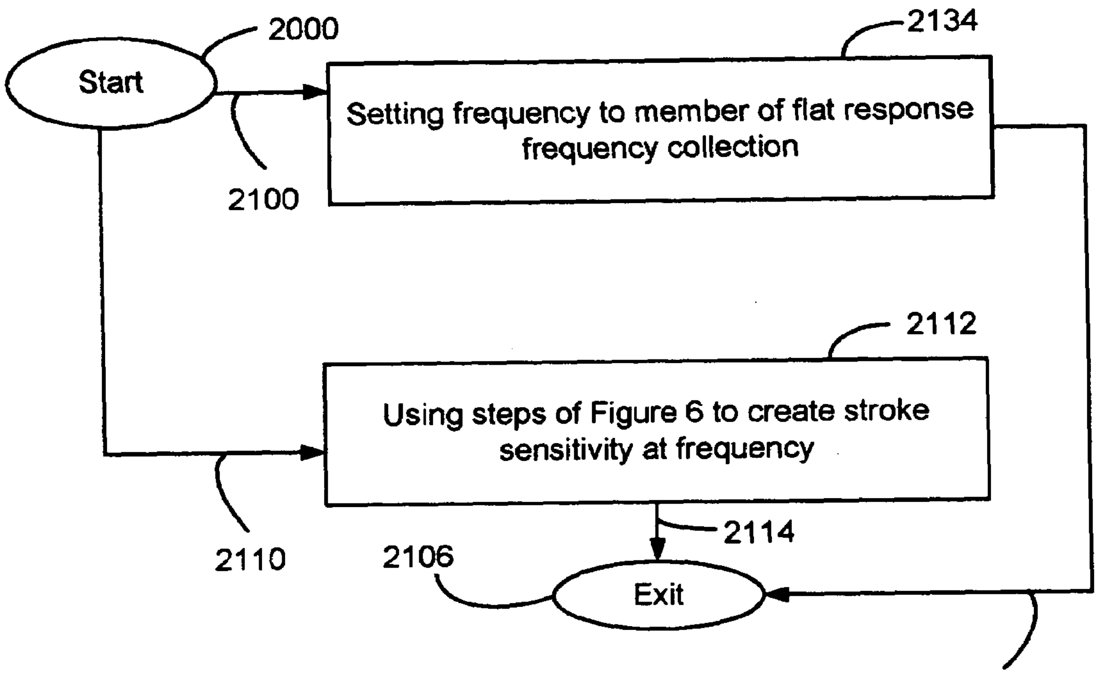
FIG. 7A shows a detail flowchart of FIGS. 2 and 6 calculating stroke sensitivity of the micro-actuator at members of the flat response frequency collection.

FIG. 7A shows a detail flowchart of program system 2000 of FIGS. 2 and 6, calculating stroke sensitivity 1700 of the micro-actuator 310 at frequency 1600, using the members of the flat response frequency collection 1610. Examples of members of the flat frequency collection 1610 are shown in FIG. 4B as a first frequency 822 and a second frequency 824, both located away from significant excitation resonances 1B–3F, and outside the bandwidth of the servo system.

In FIG. 7A, operation 2102 sets the frequency 1600 to a member of the flat response frequency collection 1610. Operation 2112 uses the steps of FIG. 6 to create the stroke sensitivity 1700 at the frequency 1600.

In certain preferred embodiments, calibration of the stroke sensitivity 1700 at the multiple members of the flat response frequency collection 1610, is used to provide a statistically robust version of the stroke sensitivity 1700.

The micro-actuator stimulus 182 may preferably, be concurrently provided to more than one micro-actuator, as shown in FIG. 3. The micro-actuators 310–316 may further preferably be concurrently stimulated in parallel, as shown.

The method and apparatus of this invention preferably calibrates the stroke sensitivity 1700 of each of the micro-actuators 310–316 of FIG. 3.

Figure 7B:
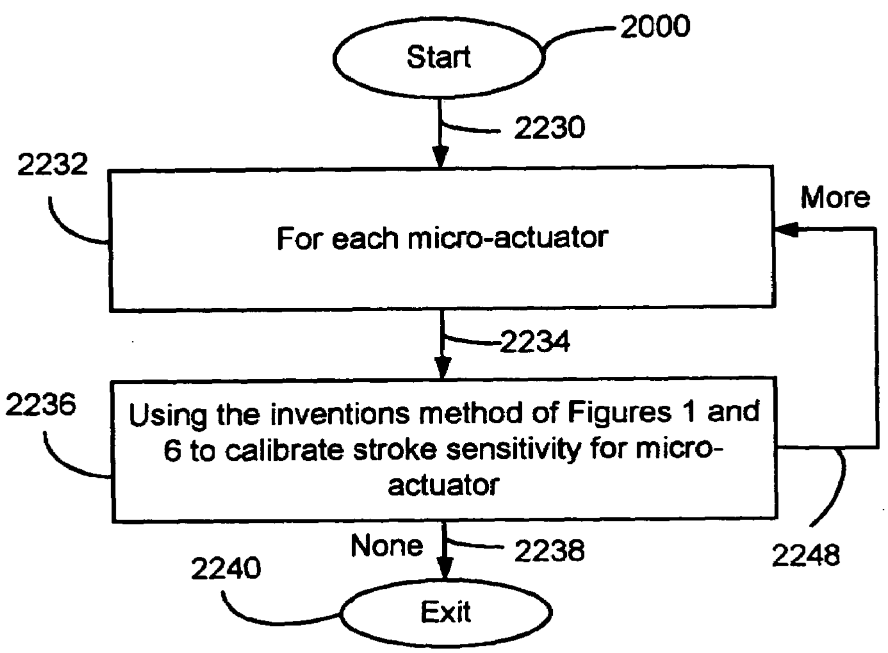
FIG. 7B shows one preferred alternative embodiment for calibrating the stroke sensitivity of multiple micro-actuators in a hard disk drive.

FIG. 7B shows one preferred alternative embodiment for calibrating the stroke sensitivity 1700 of multiple micro-actuators 310–316 in a hard disk drive 10, as shown in FIG. 3.

FIG. 7B shows a detail flowchart of program system 2000 of FIGS. 2, 6 and 7A. The invention's method calibrates each of the micro-actuators in the hard disk drive 10. It should be noted that while four micro-actuators 310–316 are shown in FIG. 3, this is done as an example. Any number of micro-actuators, each positioning at least one magnetic head, may be calibrated, and is claimed within the scope of the invention.

In FIG. 7B, operation 2202 iterates for each of the micro-actuators 310–316 in the hard disk drive 10. Operation 2206 is the body of the loop, using the invention's method as shown in FIGS. 1 to 6, to calibrate the stroke sensitivity 1700 for the micro-actuator 310.

Figure 7C:
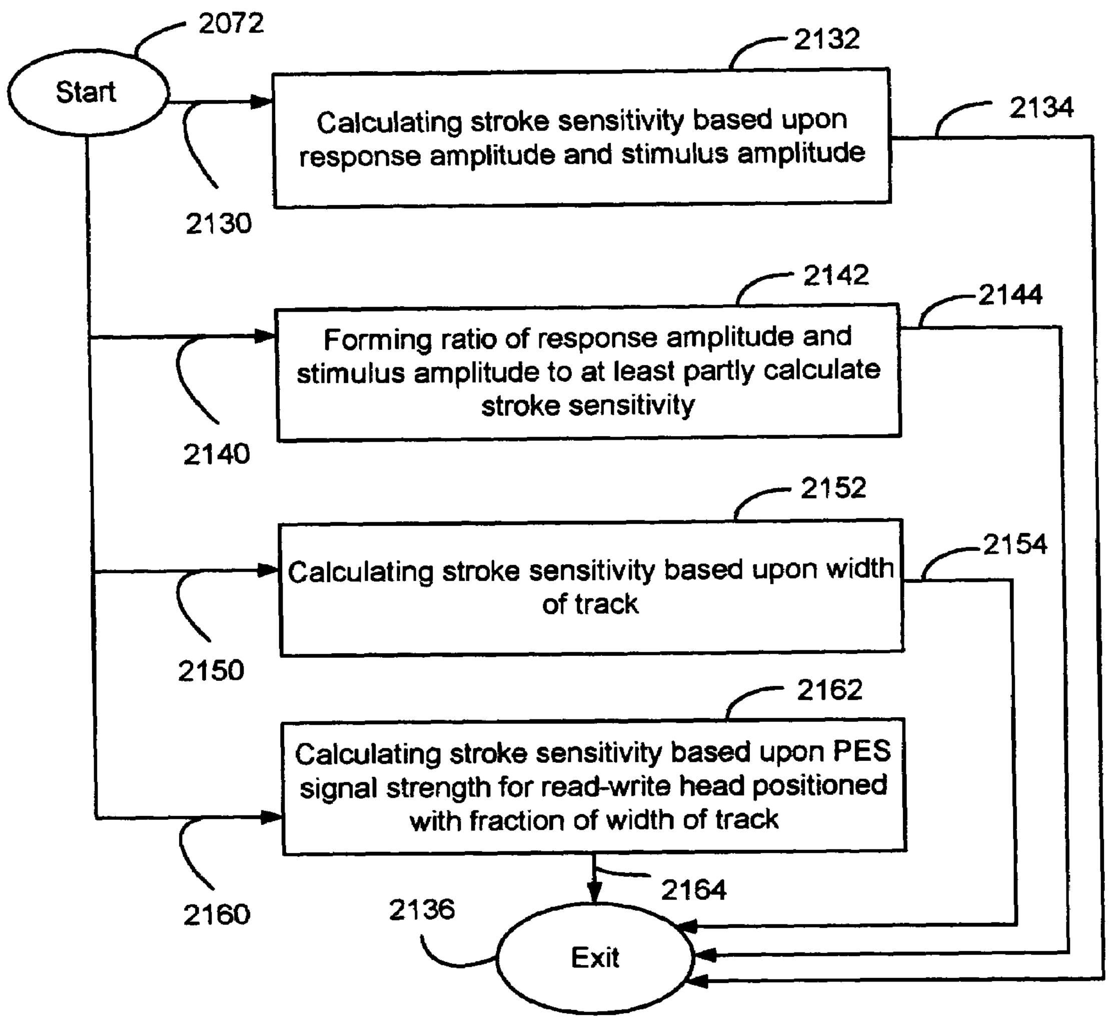
FIG. 7C shows a detail flowchart of FIG. 6 further calculating the stroke sensitivity.

FIG. 7C shows a detail flowchart of operation 2072 of FIG. 6 further calculating the stroke sensitivity 1700.

The sinusoidal stimulator 190 of FIG. 1 may generate a sinusoidal signal 192 at a stimulus amplitude 1590 and at the frequency 1600 of FIG. 2. In FIG. 7C, operation 2132 supports calculating the stroke sensitivity 1700 based upon the response amplitude 202 and based upon the stimulus amplitude 1590.

In FIG. 7C, operation 2142 supports forming a ratio of the response amplitude 202 and the stimulus amplitude 1590 to at least partly calculate the stroke sensitivity 1700.

In FIG. 7C, operation 2152 supports calculating the stroke sensitivity 1700 based upon a width of the track. Operation 2162 supports calculating the stroke sensitivity 1700 based upon the strength of the PES signal for the magnetic head linearly related to a fraction of the width of the track. In certain preferred embodiments, the track width is the reciprocal of tracks per inch, which today may be 93,000 tracks per inch. This makes the track width one inch divided by 93,000 tracks. The strength of the PES signal in volts may preferably, be linearly related to the distance of the magnetic head from the track center, in terms of track width.

It may be preferred that a volt in the PES signal be linearly related to a fraction of the track width. By way of example one volt in the PES signal relates to the distance of the magnetic head from the track center being some fraction of the track width. Two volts in the PES signal relates the distance of the magnetic head from the track center being twice the fraction of the track width.

The calculation 2072 of FIG. 6 of the stroke sensitivity 1700 may preferably involve at least some of the operations of FIG. 7C.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of calibrating at least one micro-actuator in a hard disk drive, comprising the steps of:

notch filtering a micro-actuator control signal at a frequency to create a notch filtered micro-actuator signal;

adding a sinusoidal signal at said frequency to said notch filtered micro-actuator control signal to stimulate said micro-actuator;

notch filtering a voice coil control signal at said frequency to create a notch filtered voice coil control signal to stimulate said voice coil;

demodulating a PES signal based upon said sinusoidal signal to create a response amplitude at said frequency;

decouple filtering of said micro-actuator control signal to create a decoupling micro-actuator feedback signal;

removing said PES signal and said decoupling micro-actuator feedback signal to direct control of said voice coil motor; and calculating a stroke sensitivity based upon said response amplitude;

wherein said sinusoidal signal has a stimulus amplitude at said frequency;

wherein said micro-actuator is coupled with a magnetic head in a head gimbal assembly following a track on a rotating disk surface; wherein said magnetic head follows said track in response to a voice coil motor through stimulation of a voice coil and in response to said micro-actuator; and wherein said PES signal is based upon said magnetic head following a track on said rotating disk surface in response to said notch filtered voice coil control signal and to said notch filtered micro-actuator control signal;

wherein said frequency is outside a bandwidth of a servo system in said hard disk drive, and away from any significant excitation resonance of said servo system;

wherein said servo system includes control of said voice coil motor, and of said micro-actuator through said head gimbal assembly positioning said magnetic head to follow said track and respond with said PES signal.

2. The method of claim 1, further comprising, for each member of a flat response frequency collection, of the steps of:

setting said frequency to said member of said flat response frequency collection;

using the combination of each step of claim 1 to create said stroke sensitivity at said frequency;

wherein said flat response frequency collection includes at least two frequencies, each outside said bandwidth of said servo system, and away from any of said significant excitation resonance of said servo system.

3. The method of claim 1, wherein said hard disk drive includes at least two micro-actuators.

4. The method of claim 1, wherein said hard disk drive includes at least two micro-actuators, and wherin said method steps are applied to each micro-actuator.

5. The method of claim 1, wherein the step of calculating said stroke sensitivity, is further comprised of the step of:

calculating said stroke sensitivity based upon said response amplitude and based upon said stimulus amplitude.

6. The method of claim 5, wherein the step of calculating said stroke sensitivity, is further comprised of the step of:

forming a ratio of said response amplitude and said stimulus amplitude to at least partly calculate said stroke sensitivity.

7. The method of claim 6, wherein the step of calculating said stroke sensitivity, is further comprised of the steps of:

calculating said stroke sensitivity based upon a width of said track; and calculating said stroke sensitivity based upon a strength of said PES signal for said magnetic head positioned with a fraction of said width of said track.

8. The method of claim 1, wherein said hard disk drive includes:

said PES signal is provided to a servo-controller;

said servo-controller stimulates said micro-actuator based upon at least said PES signal; and said servo-controller stimulates said voice coil based at least said PES signal.

9. The method of claim 8, wherein said servo-controller stimulates said micro-actuator is further comprised of: said servo-controller driving a micro-actuator driver to stimulate said micro-actuator.

10. The method of claim 9, wherein said micro-actuator includes a piezo-electric device.

11. The method of claim 9, wherein said micro-actuator includes a member of the collection comprising an electrostatic device and an electromagnetic device.

12. The method of claim 1 using a program system residing in a servo memory accessibly coupled with a servo-controller in said hard disk drive, implementing at least part of at least one of the steps; wherein said hard disk drive includes:

said PES signal is provided to said servo-controller;

said servo-controller stimulating said micro-actuator based upon at least said PES signal; and said servo-controller stimulating said voice coil based at least said PES signal.

13. An apparatus for calibrating at least one micro-actuator in a hard disk drive, comprising: means for notch filtering a micro-actuator control signal at a frequency to create a notch filtered micro-actuator signal;

means for adding a sinusoidal signal at said frequency to said notch filtered micro-actuator control signal to stimulate said micro-actuator;

means for notch filtering a voice coil control signal at said frequency to create a notch filtered voice coil control signal to stimulate said voice coil;

means for demodulating a PES signal based upon said sinusoidal signal to create a response amplitude at said frequency;

means for decouple filtering of said micro-actuator control signal to create a decoupling micro-actuator feedback signal;

means for removing said PES signal and said decoupling micro-actuator feedback signal to direct control of said voice coil motor; and means for calculating a stroke sensitivity based upon said response amplitude;

wherein said sinusoidal signal has a stimulus amplitude at said frequency;

wherein said micro-actuator is coupled with a magnetic head in a head gimbal assembly following a track on a rotating disk surface; wherein said magnetic head follows said track in response to a voice coil motor through stimulation of a voice coil and in response to said micro-actuator; and wherein said PES signal is based upon said magnetic head following a track on said rotating disk surface in response to said notch filtered voice coil control signal and to said notch filtered micro-actuator control signal;

wherein said frequency is outside a bandwidth of a servo system in said hard disk drive, and away from any significant excitation resonance of said servo system;

wherein said servo system includes control of said voice coil motor, and of said micro-actuator through said head gimbal assembly positioning said magnetic head to follow said track and respond with said PES signal.

14. The apparatus of claim 13, further comprising, for each member of a flat response frequency collection:

means for setting said frequency to said member of said flat response frequency collection;

means for using the combination of means of claim 13 to create said stroke sensitivity at said frequency;

wherein said flat response frequency collection includes at least two frequencies, each outside said bandwidth of said servo system, and away from any of said significant excitation resonance of said servo system.

15. The apparatus of claim 13, wherein said hard disk drive includes at least two micro-actuators.

16. The apparatus of claim 13, wherein the means for calculating said stroke sensitivity, is further comprised of:

means for calculating said stroke sensitivity based upon said response amplitude and based upon said stimulus amplitude.

17. The apparatus of claim 16, wherein the means for calculating said stroke sensitivity, is further comprised of:

means for forming a ratio of said response amplitude and said stimulus amplitude to at least partly calculate said stroke sensitivity.

18. The apparatus of claim 17, wherein the means for calculating said stroke sensitivity, is further comprised of:

means for calculating said stroke sensitivity based upon a width of said track; and means for calculating said stroke sensitivity based upon a strength of said PES signal for said magnetic head positioned with a fraction of said width of said track.

19. The apparatus of claim 13, wherein said hard disk drive includes:

said PES signal is provided to a servo-controller;

said servo-controller stimulates said micro-actuator based upon at least said PES signal; and said servo-controller stimulates said voice coil based at least said PES signal.

20. The apparatus of claim 19, wherein said servo-controller stimulates said micro-actuator is further comprised of: said servo-controller driving a micro-actuator driver to stimulate said micro-actuator.

21. The apparatus of claim 20, wherein said micro-actuator includes a piezo-electric device.

22. The apparatus of claim 20, wherein said micro-actuator includes a member of the collection comprising an electrostatic device and an electromagnetic device.

23. The apparatus of claim 13 including a program system residing in a servo memory accessibly coupled with a servo-controller in said hard disk drive, implementing at least part of at least one of the means.

* * * * *